Patented Aug. 3, 1926.

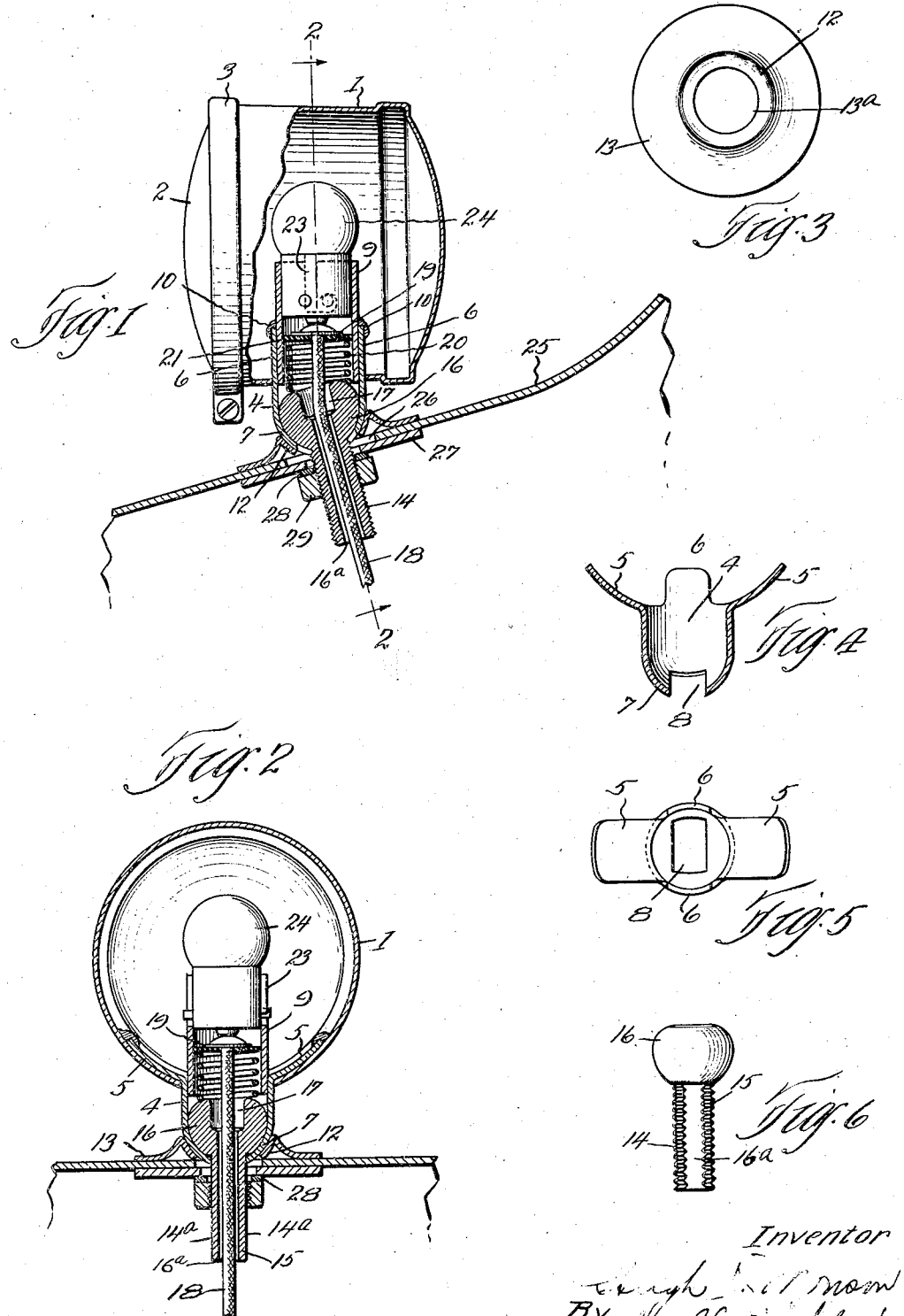

1,595,047

UNITED STATES PATENT OFFICE.

HUGH J. MONSON, OF LAKEWOOD, OHIO, ASSIGNOR TO THE GUIDE MOTOR LAMP MANUFACTURING COMPANY, OF CLEVELAND, OHIO, A CORPORATION OF OHIO.

ADJUSTABLE SIDE LIGHT FOR AUTOMOBILES.

Application filed May 18, 1925. Serial No. 30,941.

This invention relates to side lights for automobiles and is directed more particularly to an adjustable bracket for such lights.

The primary object of the present invention is to provide an adjustable bracket for the side lights of an automobile so that the lamp may be adjusted to the desired angle with respect to the automobile cowl irrespective of the slope of such cowl.

Another object is to provide an adjustable lamp bracket of this character which shall consist of few parts that are simple in construction and inexpensive to manufacture, and which may be easily and quickly installed without the use of special tools.

With these and other objects in view the invention consists in the various novel features of construction and arrangement of combination, all of which will be fully described hereinafter and pointed out in the appended claims.

In the drawings accompanying and forming part of this application, Fig. 1 is a side elevation, partly in section, of a lamp constructed in accordance with my invention and installed on the cowl of an automobile; Fig. 2 is a vertical sectional view taken on the line 2—2 of Fig. 1; Fig. 3 is a top plan view of the socket plate; Figs. 4 and 5 are respectively a vertical sectional view and a top plan view of one of the bracket members; and Fig. 6 is a side elevation of the mounting stud.

Describing the various parts by reference characters, 1 denotes a lamp substantially cylindrical in shape, such as commonly used as a side light for an automobile. This lamp is provided with the usual lens 2 and lens retaining ring 3. Mounted within a side wall of the lamp casing is a sheet metal bracket member 4 having outwardly and upwardly directed arms 5 that are adapted to be fastened to the lamp casing by soldering or brazing, or any other suitable fastening means, and arranged at right angles to the arms 5 are a pair of arms 6 which extend upwardly. The lower extremity 7 of bracket member 4 is preferably semispherical in shape and is provided with a tranverse slot 8 for a purpose to be referred to hereinafter.

The bracket member 4 receives therein a lamp socket 9, and this socket is permanently connected to the bracket member by soldering the arms 6 thereto as indicated at 10 in Fig. 1. The lower semi-spherical extremity of the bracket member is adapted to be received within a semi-spherical seat 12 formed in a socket plate 13, such plate being provided with an enlarged aperture 13$^a$ in the central portion thereof so as to loosely receive the threaded shank 14 of a mounting stud 15. The mounting stud is preferably provided with an enlarged and substantially spherical head 16 which is adapted to be received within bracket member 4, and the shank 14 thereof which is provided with flattened sides 14$^a$, extends through the slot 8 formed in such members. The mounting stud is also provided with a longitudinal bore 16$^a$ which is enlarged at the upper end thereof as indicated at 17 and this bore is adapted to receive a wire 18 which extends therethrough and is connected to a metallic washer 19 by soldering, or in any other suitable manner. A coil spring 20 is interposed between the head 16 of stud 15 and an insulating plate 21 is placed beneath washer 19. This spring tends normally to force plate 21 and washer 19 upwardly as viewed in Fig. 1, such upward movement being limited by wire 18. The socket sleeve 9 is provided with the usual bayonet slots 23 so that a standard electric lamp 24 may be inserted and retained within the socket with the center contact thereof in snug engagement with the end of wire 18.

The lamp is attached to the cowl 25 of an automobile by drilling a hole 26 therethrough of larger diameter than that of the mounting stud 15. Socket plate 13 is then placed in position on the cowl and stud 15 is inserted through aligning apertures 13$^a$ and 26. A large washer 27 and a lock washer 28 are then slipped over the stud from the underside of the cowl 25 and a nut 29 threaded on stud 14 serves to retain the parts in tight relation. Before tightening nut 29, the lamp 1 may be adjusted to any desired angle with respect to the cowl in one plane, the elongated slot 8 in socket member 4 permitting such movement. The lamp is prevented from moving in a plane at right angles thereto by reason of the flattened sides 14$^a$ of the stud engaging the sides of slot 8. The bore 16$^a$ through stud 14 being enlarged at the upper end as indicated at 17 permits the lamp to be freely adjusted to any desired angle without binding or danger of breaking the wire 18 extending therethrough.

A lamp provided with a bracket of this general character is particularly useful, as one bracket will serve for various types and styles of automobile cowls. It is well known that often there will be a different slope to the cowl on open and closed cars even though manufactured by the same company but a lamp constructed as above described will serve equally well in either instance. A lamp of this general character is also useful as an accessory for an automobile which is not provided with side lights by the factory, as one lamp bracket will serve for all makes and models and the lamp may be easily and quickly installed by anyone skilled in the use of tools. While I have shown and described my invention as being particularly adapted for side lights for an automobile, it will be understood that it could be adapted equally well to tail lights or similar uses.

Having thus described my invention, what I claim is:—

1. A lamp of the character set forth comprising a casing, a bracket member projecting from said casing and having a semi-spherical end, a seating member having a semi-spherical seat adapted to receive the end of said bracket member, an electric socket carried by said bracket member within the casing, and means for retaining said bracket in adjusted position with respect to said seating member.

2. A lamp of the character set forth comprising a casing, a bracket member projecting from said casing and having a semi-spherical end, a seating member having a semi-spherical seat adapted to receive the end of said bracket member, an electric socket carried by said bracket member within the casing, means for retaining said bracket in adjusted position with respect to said seating member, and means for limiting the movement of said lamp in one plane with respect to said seating member 3. A lamp of the character set forth comprising a casing, a hollow bracket member projecting from said casing and having a semi-spherical end, an electric socket carried by said bracket member within the casing, a seating member having a semi-spherical seat adapted to receive the end of said bracket member, a stud having a head adapted to seat within said hollow bracket member and a threaded projection adapted to extend through said seating member, and a nut adapted to engage said threaded projection.

4. A lamp of the character set forth comprising a casing, a hollow bracket member projecting from said casing and having a semi-spherical end, provided with a transverse slot, an electric socket carried by the bracket member within the casing, a seating member having a semi-spherical seat adapted to receive the end of said bracket, said seating member having an aperture in alignment with said slot, a clamping element having an enlarged head adapted to seat within said hollow bracket member and a threaded stud adapted to project through said transverse slot and said aperture, and a nut adapted to engage said threaded stud.

5. A lamp of the character set forth comprising a casing, a hollow bracket member projecting from said casing and having a semi-spherical end provided with a transverse slot, an electric socket carried by the bracket member within the casing, a seating member having a semi-spherical seat adapted to receive the end of said bracket, said seating member having an aperture in alignment with said slot, a clamping element having an enlarged head adapted to seat within said hollow bracket member and a threaded stud adapted to project through said transverse slot and said aperture, said stud having flattened sides adapted to engage said bracket member thereby to limit the movement of said lamp in one plane with respect to said seating member, and a nut adapted to engage said threaded stud.

6. A lamp of the character set forth comprising a casing, a hollow bracket member projecting from said casing and having a semi-spherical end, a seating member having a semi-spherical seat adapted to receive the end of said bracket member, a stud having a head adapted to seat within said hollow bracket member and a threaded projection adapted to extend through said seating member, said stud having a bore extending longitudinally therethrough and having an enlarged diameter in the head thereof, an electric socket carried by said bracket within the casing, and a wire extending through said bore and connected with said socket.

7. In a lamp mounting, the combination of a lamp casing having a relatively large opening in one side thereof, a spherical member having an enlarged opening therein secured within said lamp casing and extending through the opening therein, a lamp socket secured to said member, a rounded seat having an opening therein provided on a supporting member, and a bolt having an enlarged head adapted to extend through the openings in said spherical member and seat for clamping the same together and holding them in fixed position after having been properly adjusted with respect to each other.

In testimony whereof, I hereunto affix my signature.

HUGH J. MONSON.